(12) United States Patent
Veggetti et al.

(10) Patent No.: US 6,844,526 B2
(45) Date of Patent: Jan. 18, 2005

(54) METHOD AND APPARATUS FOR PRE-HEATING THE CONDUCTOR ELEMENTS OF CABLES WITH EXTRUDED INSULATORS, IN PARTICULAR CONDUCTORS WITH METAL TAPE REINFORCEMENTS

(75) Inventors: Paolo Veggetti, Monza (IT); Gaia Dell'Anna, Milan (IT); Giovanni Pozzati, Ologiate Olona (IT); Marcello Del Brenna, Milan (IT); Angelo Sala, Merate (IT)

(73) Assignee: Pirelli S.p.A., Milan (IT)

( * ) Notice: Subject to any disclaimer, the term of this patent is extended or adjusted under 35 U.S.C. 154(b) by 0 days.

(21) Appl. No.: 10/344,456

(22) PCT Filed: Aug. 2, 2001

(86) PCT No.: PCT/EP01/08951
§ 371 (c)(1),
(2), (4) Date: Aug. 4, 2003

(87) PCT Pub. No.: WO02/15205
PCT Pub. Date: Feb. 21, 2002

(65) Prior Publication Data
US 2004/0042771 A1 Mar. 4, 2004

Related U.S. Application Data
(60) Provisional application No. 60/225,309, filed on Aug. 15, 2000.

(30) Foreign Application Priority Data
Aug. 14, 2000 (EP) .............................................. 00202853

(51) Int. Cl.$^7$ .............................. F27B 9/12; F27B 9/28; B32B 15/02; H01B 13/14

(52) U.S. Cl. ................... 219/388; 219/400; 174/120 C; 174/120 SR; 428/375; 428/379

(58) Field of Search ................................. 219/388, 400; 428/375–379; 174/110 R, 113, 120 C, 120 SR, 126

(56) References Cited

U.S. PATENT DOCUMENTS

| | | | | |
|---|---|---|---|---|
| 3,935,369 | A | * | 1/1976 | George et al. .............. 428/379 |
| 4,020,213 | A | * | 4/1977 | Berglowe ................... 428/379 |
| 4,104,481 | A | * | 8/1978 | Wilkenloh et al. ............ 174/28 |
| 4,184,001 | A | * | 1/1980 | Hildreth .................. 174/120 C |
| 4,430,139 | A | * | 2/1984 | Baverstock ................. 156/353 |
| 4,430,385 | A | * | 2/1984 | Dillow et al. ............... 428/379 |
| 4,541,980 | A | * | 9/1985 | Kiersarsky et al. ...... 174/117 F |
| 4,761,053 | A | * | 8/1988 | Cogelia et al. ............. 428/379 |
| 5,192,834 | A | * | 3/1993 | Yamanishi et al. ... 174/120 SR |
| 5,972,138 | A | * | 10/1999 | Castellani et al. ............ 156/48 |
| 6,335,490 | B1 | * | 1/2002 | Higashikubo et al. ... 174/110 F |
| 2003/0173104 | A1 | * | 9/2003 | Dell'Anna et al. ...... 174/126.1 |
| 2004/0131851 | A1 | * | 7/2004 | Hiel et al. ................... 428/375 |

FOREIGN PATENT DOCUMENTS

| | | |
|---|---|---|
| EP | 30 22 129 A1 | 12/1981 |
| JP | 61-271717 | 12/1986 |

* cited by examiner

*Primary Examiner*—J. Pelham
(74) *Attorney, Agent, or Firm*—Finnegan, Henderson, Farabow, Garrett & Dunner, L.L.P.

(57) ABSTRACT

A method and apparatus for preheating the conductor elements of cables with extruded insulator essentially by forced thermal convection. Particularly for conductors with metal tape reinforcement, such as for example Milliken conductors, where it has been found that the traditional magnetic-induction heating is not satisfactory since the tape reinforcement shields the elements of conductors.

16 Claims, 6 Drawing Sheets

METHOD AND APPARATUS FOR PRE-HEATING THE CONDUCTOR ELEMENTS OF CABLES WITH EXTRUDED INSULATORS, IN PARTICULAR CONDUCTORS WITH METAL TAPE REINFORCEMENTS

CROSS REFERENCE TO RELATED APPLICATIONS

This application is a national phase application based on PCT/EP01/08951, filed Aug. 2, 2001, the content of which is incorporated herein by reference, and claims the priority of European Patent Application No. 00202853.8 filed Aug. 14, 2000, the content of which is incorporated herein by reference, and claims the benefit of U.S. Provisional Application No. 60/225,309, filed Aug. 15, 2000, the content of which is incorporated herein by reference.

BACKGROUND OF THE INVENTION

1. Field of the Invention

The present invention relates, in the manufacturing of high-voltage and extra-high voltage extruded cables, to a method and an apparatus for pre-heating the conductor elements of said cables, in particular conductors with metal tape reinforcement, such as for example, Milliken conductors.

The expression "extruded cables" refers to cables wherein the conductor elements are coated with at least one extruded insulating layer. Moreover, in the following and in the attached claims, the term "conductor" shall sometimes be used for the sake of brevity to indicate the "conductor elements" of the cable as a whole.

2. Description of the Related Art

In their most complete form, high-voltage and extra-high voltage extruded cables comprise internal conductor elements made of stranded copper or aluminium wires, an internal semiconducting layer (conductor shield), an insulating layer, an external semiconducting layer (insulation shield), a metal shielding consisting, for example, of helically wound copper strips and/or wires, extruded lead or an aluminium sheet, and optionally an external sheath, made for example of PVC, extruded polyvinyl or other suitable plastics.

The insulating layer, made—as said—by extrusion, is very critical since it is very sensitive to partial discharges that may occur in the presence of defects such as for example, micro-voids and disjunctions between adjoining layers of materials, which may be present in the insulation. These partial discharges accelerate the aging of the insulating material, thus causing its perforation.

Thus, the insulating layer must be as even as possible.

A typical extruded cables manufacturing line comprises a conductor elements pre-heater, a first-stage extruder for the internal semiconductor, a second-stage extruder for the insulation, a third-stage extruder for the external semiconductor and a triple extrusion head for the simultaneous coating of the above layers, a heating and cross-linking tube, and finally, a cooling tube to complete the cross-linking process. Alternatively, it is possible to use more extrusion heads in tandem configuration. Thus, conductors are traditionally pre-heated just before being introduced into the extrusion head for the purpose of reducing the temperature difference between the plastic at the melted state and the conductor on which it is extruded. In fact, such a temperature difference causes the formation of deformations and similar defects onto the contact surface, which—in the final analysis—alter the characteristics of the manufactured cable.

The conductor pre-heating step, moreover, allows obtaining an increase in the plant productivity. In fact, the cable advancement speed must be such as to allow the complete cross-linking of the "insulated core", expression that in the present description refers to the conductor element, the internal semiconducting layer, the insulation, and the external semiconducting layer as a whole, that is, the conductor element after passing through the extrusion section. The conductor pre-heating reduces the cross-linking times since the conductor releases heat to—or at least does not absorb from—the extruded material, thus preventing the so-called phenomenon of "freezing" of the internal semiconducting layer and of part of the insulation during extrusion. This phenomenon consists in that, without conductor pre-heating, the internal semiconducting layer and the interior of the insulation, when contacting the conductor, release heat to it faster than how they receive heat by conduction from the most external layers, so that they fall below the optimum cross-linking temperature. Thus, during the cross-linking step, there are an external layer being cross-linked, a melted intermediate layer and an internal layer at low temperature. While advancing in the manufacturing line, thanks to the heat received by convection and/or radiation, also the most internal portion, cooled and possibly solidified, is optionally re-melted, brought back to the optimum cross-linking temperature and cross-linked afterwards. As already said, after the cross-linking there is a cooling step, always in radial direction, from the outside inwards.

These changes of state and these temperature changes imply that internal stresses are generated in the insulating layer due to the thermal expansion and contraction, which may worsen the cable performance. As regards the efficiency of the manufacturing line, it is worsened by the fact that the portion that has cooled down or even solidified due to contact with the conductor must be heated again or even re-melted, thus the speed in the cross-linking tube and consequently in the entire plant must be reduced.

Internal stresses, especially in large cables, may cause a worsening in the dielectric properties of the insulating layer.

Document JP 61-271717 describes a plant for making a cable with an insulating resin coating, comprising a feeding drum, driving rollers, a pre-heating device, an extruder of resin on the pre-heated conductor, a cross-linking tube for the extruded resin, driving rollers and a coiler. The pre-heating device, which said document proposes to improve through a device for preventing leakage currents, is based on a system of current induced by an electrical transformer. Thus, the conductor is heated by the heat generated by Joule effect.

Also direct pre-heating techniques—through electrical current—and infrared pre-heating techniques have been proposed.

Nevertheless, the Applicant has noted that the pre-heating techniques mentioned above cannot be satisfactorily applied to conductors provided with metal—in particular copper— tape reinforcement, such as the so-called Milliken conductors. Milliken conductors, and more in general, lobe-section conductors, are widely used for high-voltage cables as they exhibit a lower impedance-resistance ratio with respect to equivalent cables of traditional geometry, and they are not so much affected by the so-called skin effect.

As schematically shown in the cross section of FIG. 1, a Milliken conductor 100 has a plurality of sectors or lobes 101, five lobes 101 being illustrated as an example in FIG. 1, arranged around a core 102. Core 102, made for example of aluminium, has the purpose of supporting lobes 101 eliminating central points thereof. Each lobe 101 in turn consists of a plurality of series of wires 103, 104, . . . , 106, 107. Each series of wires 103–107 is helically wound around the more internal series of wires in the same lobe 101. This multi-lobe geometry forms a substantially circular cross-section of conductor 100, wherein at the junctions between the various lobes 101, however, substantially triangular grooves 108 are formed along the lenght of conductor 100. During extrusion, the extruded material tends to penetrate into said grooves 108, that is to say, it tends to take on an irregular cross-section, not shaped as an annulus (the so-called "fioritura"). If the extrusion occurs at a relatively low pressure, only the internal semiconductor penetrates into the recesses, but if the extrusion pressure is higher, as in the case of triple-head extrusion section, also the insulator penetrates there, thus causing undesired potential gradients in the use of the cable.

To obviate this drawback, in addition to imparting mechanical stability to the conductors, lobe-section conductors—in particular of the Milliken type—are "tape reinforced", that is to say, they are wound around with a reinforcement tape 109. Said reinforcement tapes, for example, consist of a nylon nonwoven fabric semiconducting layer, a copper layer and another nylon semiconducting layer.

The Applicant has noted that, in the presence of metal tape reinforcement, the metal absorbs most of the heat provided during the conductor pre-heating, whereas the cable remains cold for the Faraday shield principle: the magnetic field lines only concatenate on the reinforcement tape, which shields the conductor arranged internally thereof from the induction current, thus generating a considerable thermal gradient between the conductor core and the reinforcement tape.

Such a thermal gradient is unacceptable since during the cross-linking process, the inner portion of the conductor, which is colder, removes heat from the reinforcement tape and the insulating material, which are hotter, with the onset the above drawbacks.

SUMMARY OF THE INVENTION

Thus, the technical problem at the basis of the present invention is to provide a method and an apparatus for pre-heating the conductor elements for extruded cables, which should provide a homogeneous pre-heating in radial direction also in the presence of metal tape reinforcement.

Therefore, in a first aspect thereof, the present invention provides a method for pre-heating the conductor elements of cables provided with at least one extruded insulating layer, in particular conductor elements with metal tape reinforcement, comprising the steps of:

a) continuously feeding said conductor elements to a pre-heating chamber;

b) heating a predetermined flow rate of a thermal carrier fluid to a predetermined pre-heating temperature; and c) feeding said predetermined flow rate of thermal carrier fluid to said pre-heating chamber.

In the present description and in the attached claims, the expression "pre-heating temperature" refers to a temperature of the thermal carrier fluid comprised between a temperature immediately higher than that of the conductor elements, and a maximum temperature such as to not degrade the polymeric layers laid afterwards onto the conductor elements, any tape present on the conductor elements, or the conductor elements themselves. Preferably, the pre-heating temperature of the thermal carrier fluid is chosen in such a way as to generate a conductor temperature which should be lower than or equal to the extrusion temperature of the melted polymer, even more preferably, about 10° C. lower than the extrusion temperature. Said temperature can be achieved by suitably adjusting the temperature and/or the flow rate and/or the fluid dynamics characteristics of the thermal carrier fluid. In this way, the conductor is pre-heated to a temperature capable of substantially reducing the duration of the subsequent step of cross-linking the layers extruded on the conductor elements.

In parallel, in a second aspect thereof, the present invention provides an apparatus for pre-heating the conductor elements of cables provided with at least one extruded insulating layer, in particular conductor elements with metal tape reinforcement, comprising:

a pre-heating chamber suitable to contain a portion of a predetermined length of the conductor elements and having an inlet and an outlet for a thermal carrier fluid;

a circuit for feeding the thermal carrier fluid towards the inlet of the pre-heating chamber, and means for heating the gaseous thermal carrier fluid.

Thanks to the achievement of the pre-heating mainly by forced thermal convection according to the invention, it is possible to effectively pre-heat both traditional cables and cables with conductor provided with metal tape reinforcement, for example with Milliken conductor, thus preventing the problems related to the presence of the reinforcement tape. Moreover, energy consumption is considerably reduced with respect to inductive pre-heating.

Preferably, the thermal carrier fluid is fed to the pre-heating chamber in turbulent condition. In this way, there is an advantageous improvement in the heat exchange coefficients.

Advantageously, the thermal carrier fluid is counter-current fed with respect to the direction of continuous feeding of the conductor. Also through this provision, the heat exchange efficiency is improved.

Preferably, the thermal carrier fluid is heated to a predetermined pre-heating temperature selected in a range comprised between 80° C. and 200° C., more preferably between 100° C. and 180° C., and even more preferably, 130–160° C. This range of temperatures is the best compromise between the time needed for the pre-heating and the final thermal gradient in radial direction of the conductor elements.

Advantageously, moreover, the method of the invention provides for detecting the conductor element temperature and changing the pre-heating temperature and/or the flow rate of the thermal carrier fluid based on the temperature thus detected. In parallel, the apparatus according to the invention can further comprise a sensor for detecting the temperature of the conductor elements, and a controller for automatically driving the power of the heating means and/or the flow rate of the thermal carrier fluid based on the temperature detected by the sensor. This feedback control always allows obtaining the desired temperature of the conductor elements when entering into the extrusion section.

In the method according to the invention, moreover, it can be provided to re-circulate, essentially in a closed loop, the thermal carrier fluid from an outlet of the pre-heating chamber to an inlet thereof. In parallel, in the apparatus according to the invention, the circuit for feeding the thermal carrier fluid can comprise a blower provided with respective delivery and suction duct extended between the blower and the inlet and outlet for the thermal carrier fluid, respectively.

In this way, the efficiency of the method or of the apparatus, respectively, is further improved.

In the apparatus according to the invention, the heating means preferably comprises at least an electrical resistor arranged in contact with the pre-heating chamber, preferably coaxially external thereto. This provides the advantages of construction simplicity and inexpensiveness, besides providing a certain heating of the conductor by radiation.

Preferably, moreover, the pre-heating chamber is closed, at its opposed ends, by closing devices having at least one hole for receiving the conductor elements, the hole being movable transversally to its longitudinal axis. In this way, the hole is movable transversally to the nominal direction of the conductor elements, thus being capable of adapting itself to the misalignments of the plant and to the configuration taken by the conductor elements during the manufacturing, in particular in catenary plants.

Preferably, each closing device has a first plate having a central projecting portion wherein said hole is obtained; a second plate closing the end of the pre-heating chamber and having a slot loosely housing the central projecting portion of the first plate; and at least a third plate that can be fastened to the second plate with the first plate interposed and in offset position with respect to said hole. In fact, such a closing device allows the mobility of the hole although providing a good tightness of the pre-heating chamber.

Even more preferably, the first plate consists of two portions around said hole, and the second plate consists of two portions around the slot. In this way, the closing devices can be mounted and removed with the conductor already extended within the plant.

Moreover, the apparatus can be mounted on an adjustable support frame. Said support frame allows the adaptation to the nominal position of the conductor in the plant, particularly in catenary plants.

In a third aspect thereof, the present invention relates to a method for manufacturing a cable provided with at least one extruded insulating layer, comprising the steps of:
- pre-heating the conductor elements of the cable according to the method illustrated above;
- extruding at least one insulating layer on the pre-heated conductor elements; and
- heating and subsequently cooling the insulated core consisting of said conductor elements provided with at least said insulating layer for cross-linking at least said insulating layer.

In a fourth aspect thereof, finally, the present invention relates to a plant for manufacturing a cable provided with at least one extruded insulating layer comprising an apparatus for pre-heating the conductor elements of the cable having the described features, an extrusion section for at least said insulating layer, a cross-linking tube for the extruded layers, and means for continuously feeding the conductor elements.

BRIEF DESCRIPTION OF THE DRAWINGS

Features and advantages of the invention will now be illustrated with reference to the preferred embodiment, represented by way of a non-limiting example in the attached drawings, wherein.

DETAILED DESCRIPTION OF THE INVENTION

Figure 1:
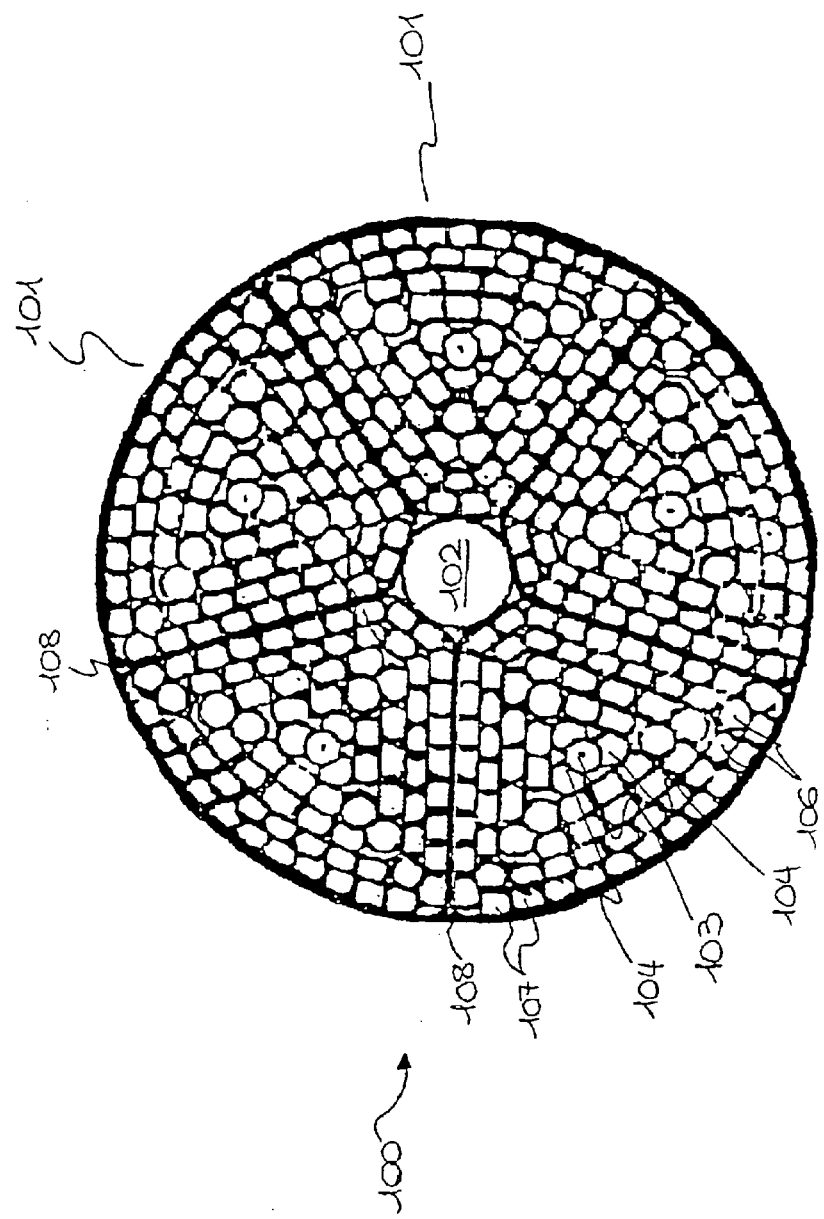
FIG. 1, which was already referred to, schematically shows a section through a Milliken type conductor.
Figure 2:
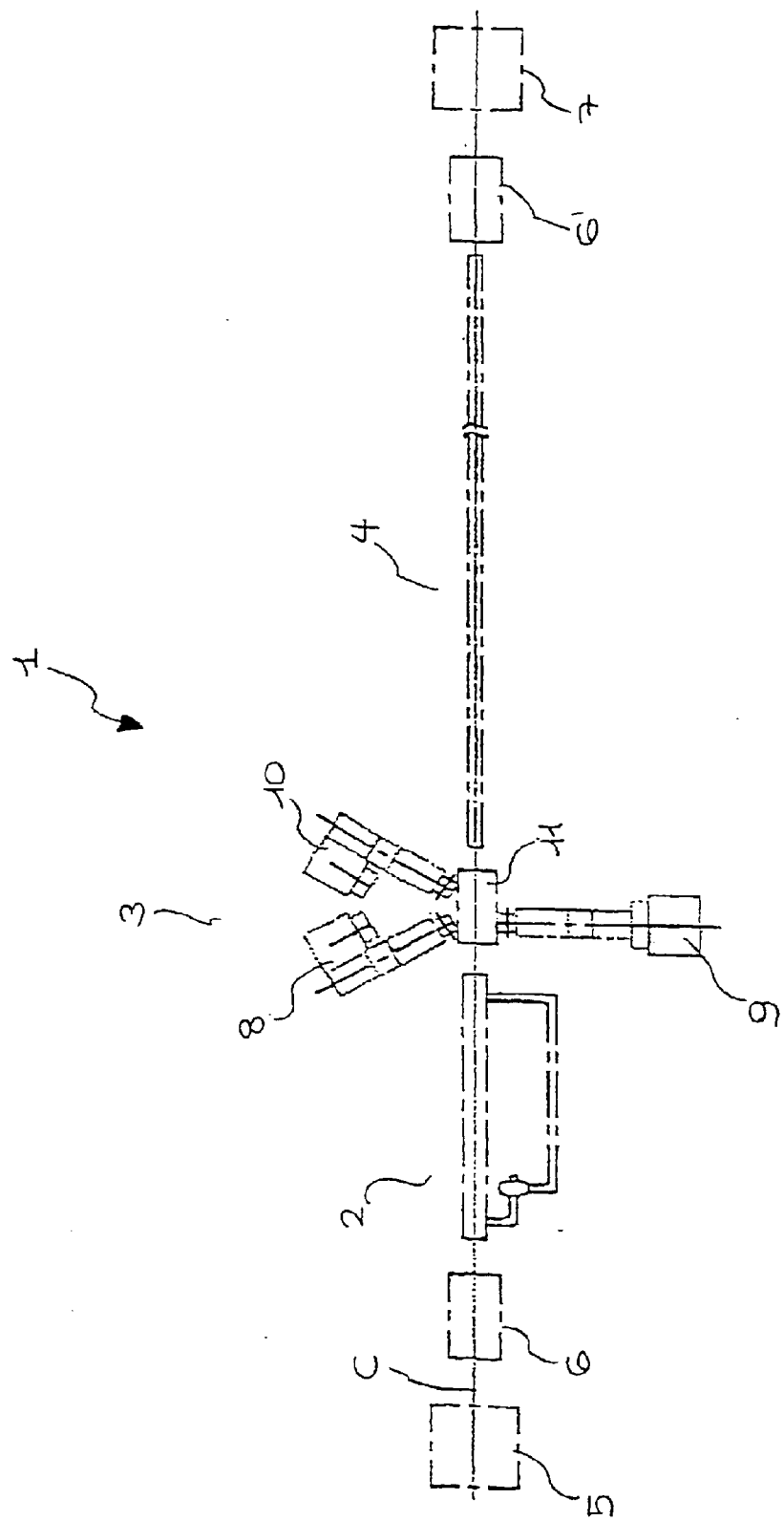
FIG. 2 schematically shows a plant for manufacturing an extruded cable having an apparatus for pre-heating the conductor elements of extruded cables according to the present invention.

A plant 1 for manufacturing a cable provided with at least one extruded insulating layer, shown in FIG. 2, essentially comprises a pre-heating apparatus 2, an extrusion section 3, and a cross-linking tube 4, sequentially crossed by a conductor C continuously fed by an unwinding coil 5, through a so-called delivery "caterpillar" 6. Downstream of the cross-linking tube 4 there are provided a drawing "caterpillar" 6' and a winding coil 7 for the finished cable. Caterpillars 6, 6', of course, are only exemplificative of the continuously feeding means of conductor C in plant 1.

The extrusion section 3 is schematically shown as being provided with an extruder 8 for the internal semiconducting layer, an extruder 9 for the insulating layer, an extruder 10 for the external semiconducting layer and a triple extrusion head 11, but of course, other per se known configurations are possible.

Finally, it shall be noted that, although FIG. 2 shows a plan view of a plant 1 of the horizontal or catenary type, this must not be construed as limiting the invention to said types of plants, as it can be applied to vertical plants as well.

Figure 3:
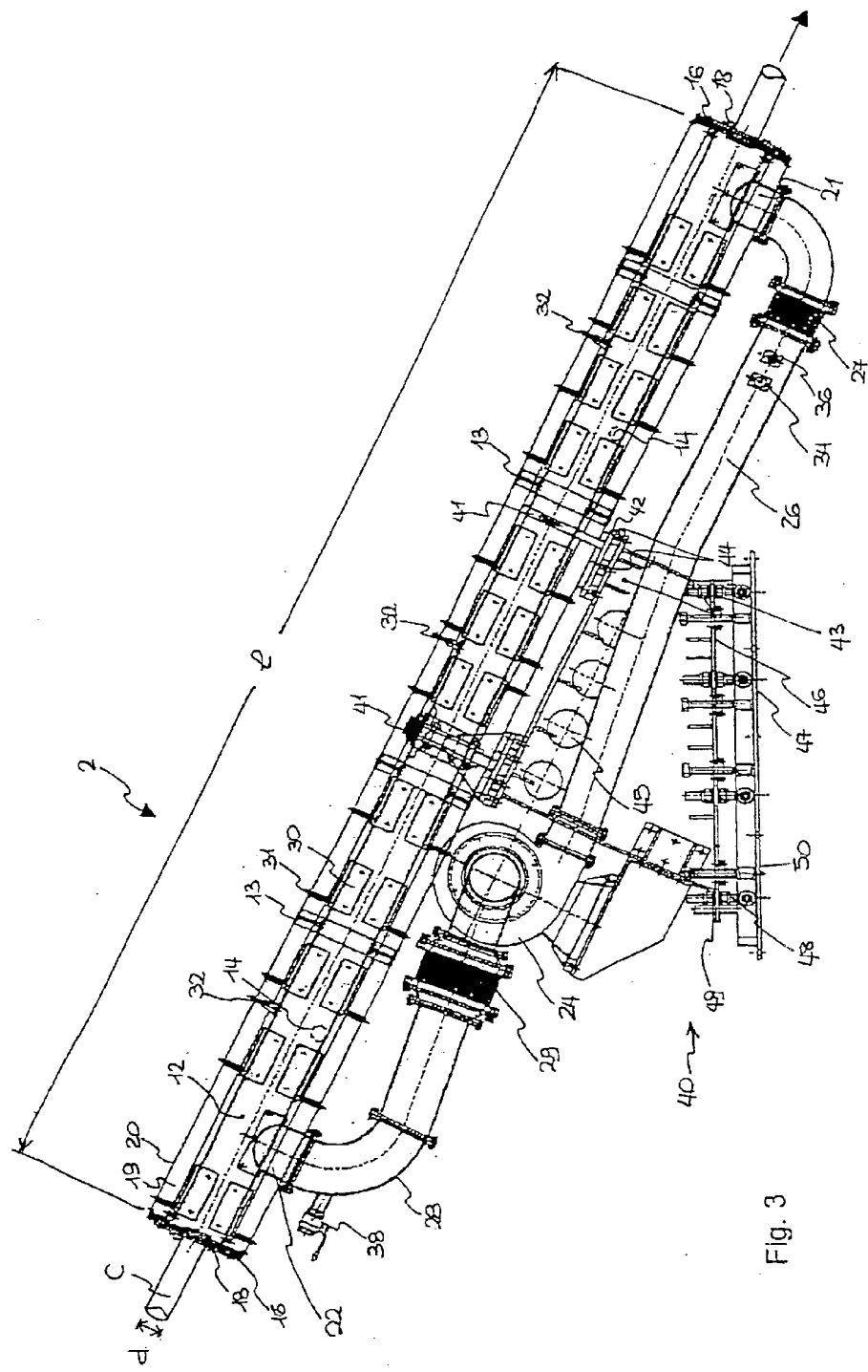
FIG. 3 shows a side view of a preferred embodiment of a pre-heating apparatus according to the invention.

The pre-heating apparatus 2 according to the preferred embodiment of the invention, shown in FIG. 3, has first of all a pre-heating chamber 12 suitable to contain a portion of length 1 of the conductor elements C intended for the production of a cable provided with extruded insulation, preferably supported within pre-heating chamber 12 by at least one support 14.

The pre-heating chamber 12 preferably has an elongated tubular shape, for example a stainless steel tube subject to chemical nickel-plating treatment, and has at its ends tight closing devices 16 of chamber 12, provided with a through hole 18 to allow the passage of the conductor elements C. In view of the length 1 of the pre-heating chamber 12, it can be made of more portions, as shown by junctions 13 in FIG. 3.

Figure 4:
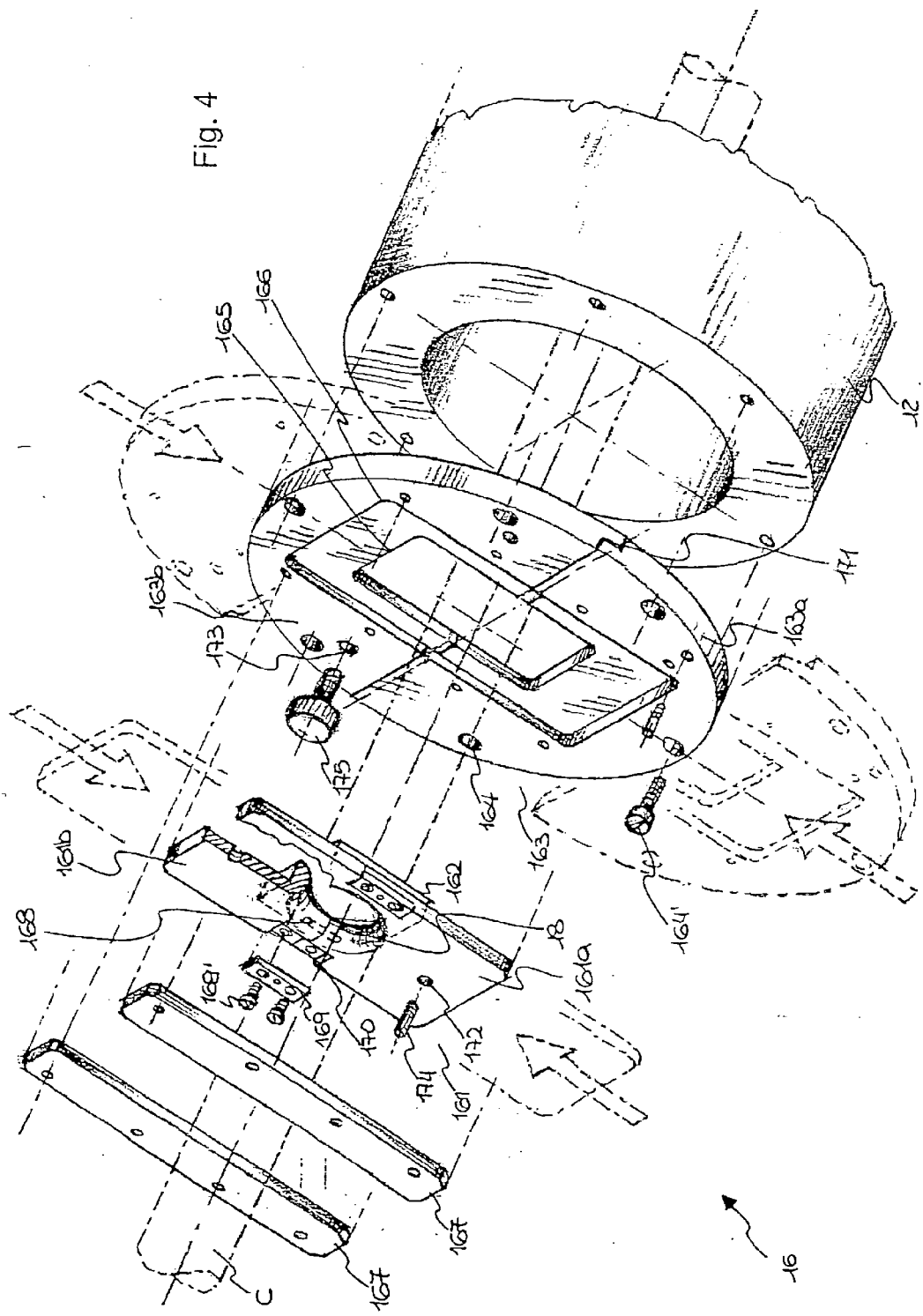
FIG. 4 shows an exploded and partially broken-away view of a closing device of a pre-heating chamber of the apparatus of FIG. 3.
Figure 5:
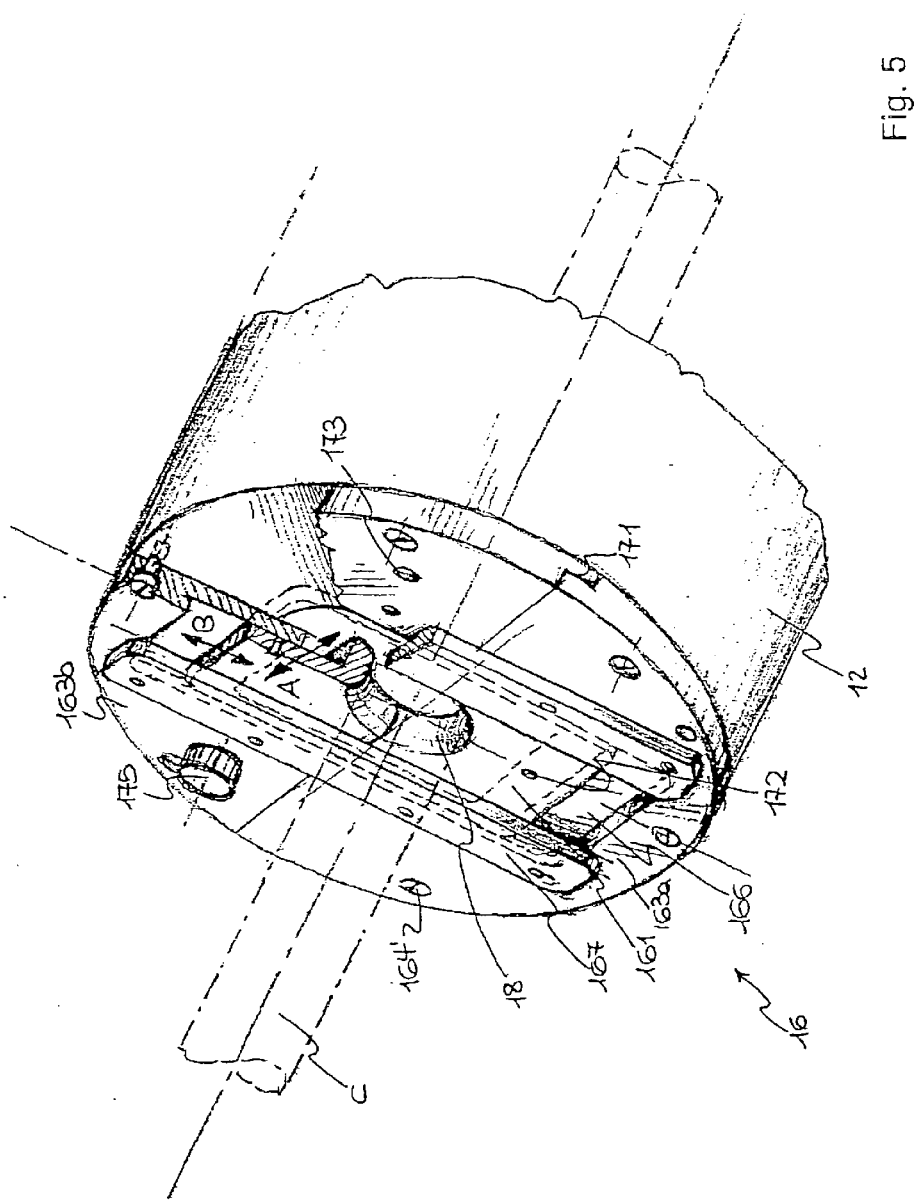
FIG. 5 shows a view of the closing device of FIG. 4 in the mounted state and partially broken-away.

FIGS. 4 and 5 show—respectively in exploded view and in the mounted state—a preferred embodiment of the closing device 16, wherein the through hole 18 is transversally movable, along the double arrows A and B of FIG. 5, with respect to the nominal direction of the conductor elements C in order to adapt itself to the configuration taken by them, which is variable with the horizontal movement of the delivery caterpillar 6 of plant 1. More in particular, each closing device 16 comprises a first plate 161 having a projecting central portion 162, wherein hole 18 is obtained. A second plate 163 has an outer size corresponding to the end aperture of the pre-heating chamber 12, and holes 164 for the fastening to it through screws 164'. The second plate 163, moreover, has a slot 165 having a slightly larger size than the projecting central portion 162 of the first plate 161, so as to loosely house it. Preferably, and as shown, slot 165 is surrounded by an undercut seat 166 having a size as much larger than the first plate 161 as slot 165 is larger than the projecting central portion 162 of the first plate 161. At least a third plate 167 (two of them are shown) can be fastened, for example by screws (not shown) to the second plate 163 with the first plate 161 interposed and, in the fastened state, it stays in offset position with respect to hole 18 in any position of the first plate 161 within the seat 166 of the second plate 163.

For the purpose of allowing mounting and removal of the closing devices 16 without removing conductor C from plant 1, the first plate 161 preferably consists of two halves 161*a* and 161*b* around the hole 18, held together by pins 168 (only one is shown in FIG. 4) and by small plates 169 fixable into undercut seats 170, for example by screws 169'. Similarly, the second plate 163 preferably consists of two halves 163*a* and 163*b* around slot 165, preferably having a stepwise diametric edge 171 for a better tightness. The dashed portions in FIG. 4 illustrate the mounting movement of plates 161, 163, around conductor C. Finally, in the first and second plate 161, 163 there are shown threaded blind holes, respectively 172, 173, for receiving extraction knobs, respectively 174, 175. It must be noted that the rectangular shape of slot 165 and of the first plate 161, together with the square shape of the central projecting portion 162 of the first plate 161, imply a different movement capability of hole 18 along the two directions A and B, perpendicular to one another and to the axis of the pre-heating chamber 12. The closing devices 16 are fastened to the pre-heating chamber 12, in a catenary plant 1, with such an orientation that the most limited movement in direction A occurs horizontally with respect to the ground, whereas the widest movement in direction B occurs in the vertical direction. The horizontal movement capability thus provided is particularly useful for compensating axial misalignment errors during the installation of the pre-heating apparatus 2, whereas the vertical movement capability is particularly useful during operation, so that hole 18 can follow the catenary pattern of conductor C.

Turning back to FIG. 3, the pre-heating chamber 12 is preferably surrounded by an insulation. 19, for example consisting of a fibreglass or ceramic fibre layer enclosed by an aluminium sheet 20.

Moreover, chamber 12 is provided with an inlet 21 and an outlet 22 for a gaseous thermal carrier fluid, for example air, which is fed by a blower 24 connected to inlet 21 and to outlet 22 respectively through a delivery duct 26 and a suction duct 28, which are preferably made of steel and insulated. The delivery duct 26 and the suction duct 28 are preferably provided with a respective device 27 and 29 for compensating the thermal expansions and contractions, for example in the form of metal bellows.

Preferably, as shown in FIG. 3, the air or other fluid circulates in the pre-heating chamber 12 from right leftwards, that is to say, counter-current with respect to the feeding direction of conductors C. This allows improving the heat exchange efficiency, which essentially occurs by forced thermal convection.

In fact, the thermal carrier fluid, which in the pre-heating chamber 12 contacts conductor C, is heated through suitable heating means, represented in FIG. 3 as twenty-four half-shell electrical resistors 30 arranged along the pre-heating chamber 12, internally of the insulation, through which wiring 31 for feeding resistors 30 are visible. Of course, the "heating means" can be arranged along the entire fluid circuit, that is to say, also along ducts 26, 28, and it can also be in other forms, for example it can consist of a heat exchanger, which in particular can use hot fluids obtained from other parts of plant 1.

Nevertheless, it must be noted that the use of electrical resistors 30 along the pre-heating chamber 12 allows supplementing the heat exchange by forced convection with heat exchange by radiation from the walls of the pre-heating chamber 12, which in turn are in contact with resistors 30, thus improving the efficiency of apparatus 10. Nevertheless, the heat exchange by radiation is negligible with respect to that by convection, as it has been experimentally proven that it amounts to about 4%.

Blower 24 can for example be a centrifugal fan.

Moreover, apparatus 2 is preferably provided with a sensor (not shown) for detecting the temperature of conductor C, for example an optical pyrometer, arranged downstream of the pre-heating chamber 12, prior to the inlet of the extrusion section 3, and with a controller (not shown) which, on the basis of the temperature detected by the sensor, controls the thermal carrier fluid flow rate and/or the current flowing in resistors 30. Preferably, moreover, the controller receives other parameters in input, provided by suitable sensors, for example the temperature of the pre-heating chamber 12 and the temperature of the air along the circuit consisting of blower 24 and delivery and suction ducts 26, 28. By way of example, FIG. 3 shows three thermocouples 32 along the pre-heating chamber 12, and a thermocouple 34 along the delivery duct 26. Moreover, in the same delivery duct 26 there is shown a hole 36 for receiving an anemometer (not shown) for controlling the air flow rate. Finally, in the suction duct 28 there is shown a faucet 38 for compensating the circulating air, normally closed, but that can be useful during installation of the pre-heating apparatus 2.

Moreover, the pre-heating chamber 12 can be openable so as to facilitate the insertion and the extraction of conductor C and of the closing devices 16, or it can be not openable, so as to significantly simplify the mechanical implementation, thus decreasing costs. In the case of an openable chamber, it can be suitable for the safety of the personnel in charge to provide for a control over the temperature of the same chamber 12 and its effective opening and closing.

Moreover, for the purpose of adapting itself to the configuration taken by conductor C in plant 1, particularly in catenary plants, apparatus 2 can advantageously be arranged on an adjustable support frame 40. The support frame 40 comprises chases 41 for supporting the tube which forms the pre-heating chamber 12. Base 42 of chases 41 is fastened to a frame 43 with interposed bearings 44, serving both as thermal insulators and as vibration dampers. Frame 43 is preferably lightened by a series of holes 45, and has a substantially trapezoidal shape. In its lower portion, frame 43 is provided with a plate 46, which is fastened to a second plate 47, constrained to the floor, through a double series of bolts. Bolts 48 of a first series are each provided with two nuts 49, and they serve for clamping the two plates 46, 47, whereas bolts 50 of a second series serve for allowing fine adjustment of the slope of the upper side of frame 43, and thus, of the pre-heating chamber 12, so as to be suitable for the insertion in the catenary plant.

With the described apparatus, the method according to the invention can be actuated as follows.

Firstly, the conductor elements C, which must be pre-heated before entering into the extrusion section 3, are continuously fed into the pre-heating chamber 12. At the same time, in the pre-heating chamber 12 a predetermined flow rate of air or other preferably gaseous thermal carrier fluid is heated to a pre-heating temperature, as defined previously, so as to heat the portion of conductor C essentially by forced thermal convection.

The thermal carrier fluid is preferably fed in turbulent condition and counter-current with respect to the continuous feeding direction of conductor C.

The pre-heating temperature of the thermal carrier fluid and its flow rate are related as follows, in the following simplifying hypotheses:

the motion of conductor C within pre-heating chamber 12 can be disregarded since its speed (typically 0.2–0.6 m/s) is much lower than the speed of the thermal carrier fluid (about 19–38 m/s);

the effect of radiation on heat exchange is negligible as it is equal to about 4% of that provided by forced convection;

the thermodynamic properties of air can be deemed as constant since its thermal head, at steady state, is of just 10° C.

The thermal power $Q_{Cu}$ needed to cause a change $\Delta T_{Cu}$ in the conductor is given by the formula of Equation 1:

$$Q_{Cu} = q_{Cu} \cdot C_{pCu} \cdot \Delta T_{Cu} \quad \text{(Eq. 1)}$$

where $q_{Cu}$ is the feed rate of the conductor and $c_{pCu}$ is the specific heat of the conductor.

Similarly, the thermal power $Q_f$ released by the thermal carrier fluid can be expressed by Equation 2:

$$Q_f = q_f C_{pf} \Delta T_f \quad \text{(Eq. 2)}$$

where $q_f$ is the flow rate of the thermal carrier fluid and $c_{pf}$ is the specific heat of the thermal carrier fluid.

Considering leaks, the thermal power $Q_{req}$ to be provided to conductor C is given by Equation 3:

$$Q_{req} = Q_{Cu} K \quad \text{(Eq. 3)}$$

where K is a constant greater than the unit.

The thermal power exchanged between conductor C and the thermal carrier fluid is a function of the heat exchange coefficient $h_c$, of the heat exchange area A, and of the initial and final temperatures of conductor C, and of the thermal carrier fluid. In the case of forced convection in turbulent condition and counter-current flow, one has Equation 4:

$$Q_c = h_c \cdot A \cdot \frac{(T_{Cu} - T_f)_{in} + (T_{Cu} - T_f)_{out}}{\ln \frac{(T_{Cu} - T_f)_{in}}{(T_{Cu} - T_f)_{out}}} \quad \text{(Eq. 4)}$$

where $T_{cu}$ is the temperature of conductor C and $T_f$ is the temperature of the thermal carrier fluid, where suffix in indicates the inlet of the pre-heating chamber 12, that is, essentially, the outlet 22 of the thermal carrier fluid, and suffix out indicates the outlet of the pre-heating chamber 12, that is, essentially, the inlet 21 of the thermal carrier fluid. In the case of heat exchange by convection, coefficient $h_c$ is given by Equation 5:

$$h_c = 0,023 \cdot Re^{0,8} \cdot Pr^{0,4} \cdot \frac{\lambda}{D_{Cu}} \quad \text{(Eq. 5)}$$

where Re is Reynolds number, Pr is Prandtl number, $\lambda$ is the thermal conductivity of the fluid, and $D_{Cu}$ is the diameter of conductor C.

By replacing Equation 1 into Equation 3 and equating to Equation 2, and by equating Equations 2 and 4, a two-equation system is obtained. Said system relates the two unknown quantities, flow rate and temperature of the thermal carrier fluid at the outlet of the pre-heating chamber 12, essentially at the inlet 21 of the thermal carrier fluid. It has been proved that, with the flow rate value thus calculated, the state actually is turbulent as hypotesized, that is Re>2400.

Advantageously, moreover, according to the method of the invention, the temperature of the conductor elements C can be detected by the sensor, preferably at the outlet of the pre-heating chamber 12, that is to say, after the step of feeding the heated thermal carrier fluid, and the pre-heating temperature and/or the fluid flow rate can be changed by means of the controller, based on the temperature thus detected.

Preferably, moreover, the thermal carrier fluid is re-circulated essentially in a closed loop from outlet 22 of the pre-heating chamber 12 to inlet 21 thereof.

After pre-heating, in the method for manufacturing a cable provided with at least one extruded insulating layer according to the invention, at least the insulating layer is extruded on the pre-heated conductor elements C; then, the insulated core is heated and afterwards cooled to cross-link the insulating layer and any other extruded layers.

Figure 6:
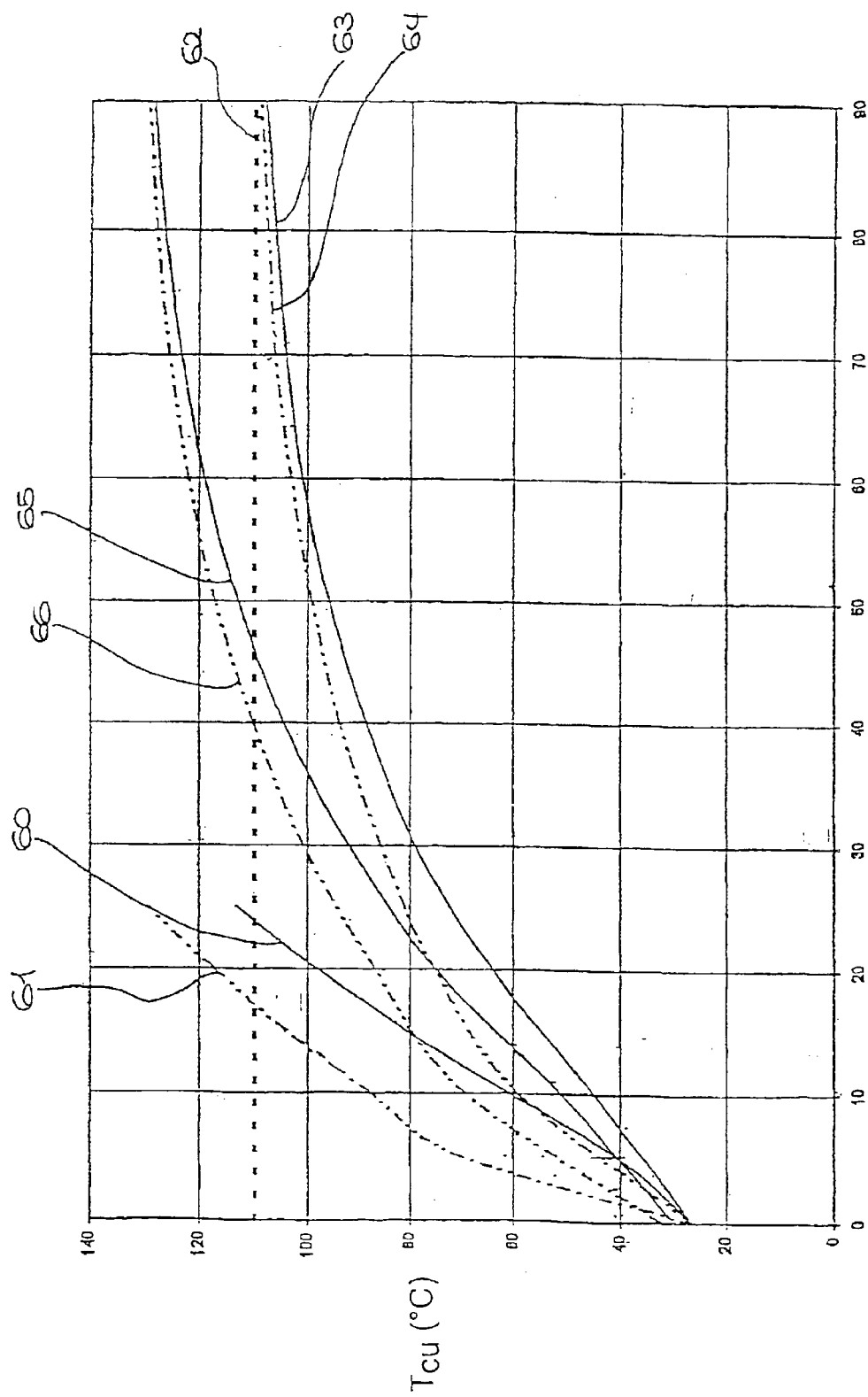
FIG. 6 shows a graph of the results of experimental tests.

By way of example, for pre-heating to about 110° C. a conductor C having a 1600-mm² section and a 52-mm diameter d, fed at a speed of 0.25–0.6 m/min, a thermal carrier fluid flow rate of 0.5–1.5 m³/s will be used, fed at a speed of 19–38 m/s and heated to a pre-heating temperature of 140–170° C. In fact, experimental tests have been carried out in such conditions, using air as gaseous thermal carrier fluid. FIG. 6 shows the pattern of temperature $T_c$ (° C.) of conductor C as a function of time t (min), wherein solid line curves represent the temperature detected by a thermocouple arranged at the centre of conductor C, whereas broken lines represent the temperature detected by a thermocouple arranged at the periphery of conductor C, halfway its length l. As it can be appreciated from the diagram, the experimental tests have proved that with an air temperature of 200° C.—curves 60, 61—the final conductor temperature (indicated by dotted line 62 of FIG. 6) is reached very quickly (20–25 min), but with a very high gradient in radial direction (the temperature of the conductor surface is about 15° C. higher than that of the centre). On the contrary, with an air temperature of about 120° C.—curves 63, 64—the temperature gradient at the final temperature is very low (about 1° C.), but the heating times significantly increase (about 90 minutes). On the contrary, with an air temperature of 145° C.—curves 65, 66—the best compromise is obtained, with a heating time of about 45 minutes and a temperature gradient of about 5° C.

It is worth noting that, although the invention is especially applicable for pre-heating tape reinforced conductor elements, it is advantageous also in the absence of metal tape reinforcement in terms of energy consumption. In fact, in the above example the energy consumption of the apparatus is of about 35 kW, of which 5–10 kW for the blower and 1.2 kW for each of the twenty-four shell-shaped resistors, whereas an induction pre-heater would require about 80 kW.

It is evident that several modifications, changes, replacements and integrations can be made to the previously described embodiments without thus departing from the scope of the invention, as defined by the following claims.

What is claimed is:

1. A method for pre-heating conductor elements of cables provided with at least one extruded insulating layer, comprising the steps of:
   a) continuously feeding said conductor elements to a pre-heating chamber;
   b) heating a predetermined flow rate of a thermal carrier fluid at a predetermined pre-heating temperature; and
   c) feeding said predetermined flow rate of thermal carrier fluid to said pre-heating chamber.

2. The method according to claim 1, wherein said step c) of feeding the thermal carrier fluid comprises feeding said fluid in turbulent condition.

3. The method according to claim 1, wherein said Step c) of feeding the thermal carrier fluid comprises feeding the fluid counter-current with respect to the continuous feeding direction of said conductor.

4. The method according to claim 1, wherein said predetermined pre-heating temperature is selected in a range between 80 and 200° C.

5. The method according to claim 1, comprising the further steps of:
   d) detecting the temperature of said conductor elements; and
   a) changing said predetermined pre-heating temperature and/or said predetermined flow rate of the thermal carrier fluid based on the temperature detected in said step d).

6. The method according to claim 5, comprising the further step of:
   f) re-circulating, essentially in a closed loop, said thermal carrier fluid from an outlet of said pre-heating chamber to an inlet of said pre-heating chamber.

7. A method for manufacturing a cable provided with a least one extruded insulating layer, comprising the steps of:
   a) pre-heating the conductor elements of the cable according to the pre-heating method of any one of claims 1–6;
   b) extruding at least one insulating layer on the pre-heated conductor elements; and
   c) heating and subsequently cooling the insulated core consisting of said conductor elements provided with at least said insulating layer for cross-linking at least said insulating layer.

8. An apparatus for pre-heating the conductor elements of cables provided with at least one extruded insulating layer, comprising:
   a pre-heating chamber suitable to contain a portion of a predetermined length of said conductor elements and having an inlet and an outlet for a thermal carrier fluid;
   a circuit for feeding the thermal carrier fluid to said inlet of the pre-heating chamber; and
   means for heating the thermal carrier fluid.

9. The apparatus according to claim 8 wherein said heating means comprises at least one electrical resistor contacting said pre-heating chamber.

10. The apparatus according to claim 8, wherein said circuit for feeding the thermal carrier fluid comprises a blower provided with respective delivery and suction ducts extended between said blower and said inlet and outlet of the thermal carrier fluid, respectively.

11. The apparatus according to claim 8, wherein said pre-heating chamber is closed, at its opposed ends, by closing devices having at least one hole for receiving the conductor elements, said hole being movable transversally to its longitudinal axis.

12. The apparatus according to claim 11, wherein each of said closing devices has a first plate having a central projecting portion wherein said hole is obtained; a second plate for closing said end of the pre-heating chamber and having a slot loosely housing said central projecting portion of said first plate; and at least a third plate that can be fastened to said second plate with the first plate interpose and in offset position with respect to said hole.

13. The apparatus according to claim 12, wherein said first plate consists of two portions around said hole and said second plate consists of two portions around said slot.

14. The apparatus according to claim 8, further comprising an adjustable support frame.

15. The apparatus according to claim 8, further comprising a sensor for detecting the temperature of said conductor elements and a controller for automatically driving the power of said heating means and/or the flow rate of the thermal carrier fluid based on the temperature detected by said sensor.

16. A plant for manufacturing a cable provided with at least one extruded insulating layer comprising an apparatus for pre-heating the conductor elements of the cable according to any one of claims 8–15; an extrusion section for at least said insulating layer; a cross-linking tube for the extruded layers; and means for continuously feeding the conductor elements.

* * * * *

UNITED STATES PATENT AND TRADEMARK OFFICE
CERTIFICATE OF CORRECTION

PATENT NO. : 6,844,526 B2
DATED : January 18, 2005
INVENTOR(S) : Paolo Veggetti et al.

It is certified that error appears in the above-identified patent and that said Letters Patent is hereby corrected as shown below:

Column 11,
Line 1, "Step" should read -- step --.
Line 22, "with a" should read -- with at --.

Column 12,
Line 20, "interpose" should read -- interposed --.

Signed and Sealed this

Seventh Day of June, 2005

JON W. DUDAS
*Director of the United States Patent and Trademark Office*